United States Patent [19]

Belew

[11] Patent Number: 4,657,044

[45] Date of Patent: Apr. 14, 1987

[54] DUAL MOTION VALVE WITH SINGLE MOTION INPUT

[75] Inventor: Robert R. Belew, Huntsville, Ala.

[73] Assignee: The United States of America as represented by the Administrator of the National Aeronautics and Space Administration, Washington, D.C.

[21] Appl. No.: 751,691

[22] Filed: Jul. 3, 1985

[51] Int. Cl.⁴ ............................................. F16K 3/02
[52] U.S. Cl. .................................... 137/606; 251/165
[58] Field of Search .......................... 137/606, 625.31; 251/164, 165, 166

[56] References Cited

U.S. PATENT DOCUMENTS 904,307  11/1908  Chandler ............................. 251/165
4,436,108  3/1984  Ellsworth ....................... 137/606 X

FOREIGN PATENT DOCUMENTS 8382  of 1893  United Kingdom ................ 251/164

Primary Examiner—Robert G. Nilson
Attorney, Agent, or Firm—Joseph H. Beumer; John R. Manning; Leon D. Wofford, Jr.

[57] ABSTRACT

A dual motion valve (A) includes two dual motion valve assemblies (10, 12) having a rotary input which allows the benefits of applying both rotary and axial motion to a rotary sealing element (24) having a plurality of ports (43). The motion of the rotary sealing element during actuation provides axial engagement of the rotary sealing element with a stationary valve plate (22) which also has ports (38). Fluid passages are created through the valve when the ports of the rotary sealing element are aligned with the ports of the stationary valve plate. Alignment is achieved through rotation of the rotary sealing element with respect to the stationary valve plate. The fluid passages provide direct paths which minimize fluid turbulence created in the fluid as it passes through the valve (A).

13 Claims, 7 Drawing Figures

DUAL MOTION VALVE WITH SINGLE MOTION INPUT

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

The invention relates to a rotary input valve mechanism which converts a single rotary input into a combination rotary movement-axial movement output for controlling fluid flow between adjacent fluid carrying chambers. Heretofore, previous devices have been proposed such as U.S. Pat. No. 4,288,060, granted on Sept. 8, 1981, which discloses a valve mechanism which converts through a relatively complex linkage a rotary input into an axial movement-pivotal movement output. A valve mechanism wherein a valve washer is held against rotation as a rotary input compresses the valve actuator into its seat is disclosed in U.S. Pat. No. 4,106,747, granted on Aug. 15, 1978. While the above patented valve mechanisms have utility in preventing rotational frictional contact between a valve element and its seat, they are not entirely suitable because the fluid passageways between adjacent fluid zones created due to their open position is indirect and circuitous. Such passageways create undesirable turbulence in the fluid as it flows from fluid zone to fluid zone. Thus, in cases where the rapid combining of different fluids is required, as in diffusion mixing experiments, the patented valves would not be satisfactory in that when open, they would likely cause excessive turbulence which would consequently inhibit the rate of diffusion mixing between the fluids.

Accordingly, an important object of the present invention is to provide a valve which will reduce turbulence and convection mixing of fluids being mixed while the valve is being opened or closed by allowing the fluid to travel a relatively direct path from chamber to chamber.

Another important object of the present invention is to provide a valve which is of relatively simple construction.

Still another important object of the present invention is to provide a valve which requires for actuation only a single rotary input.

Yet another important object of the present invention is to provide a valve which when supplied with a rotary input rotates a predetermined distance, while simultaneously moving axially, to minimize fluid turbulence and mixing during actuation of the valve.

SUMMARY OF THE INVENTION

It has been found according to the present invention that a valve mechanism can be constructed which, when supplied with a rotary input for opening the valve, rotates a rotary valve plate having a number of openings a preset distance until the openings align with other openings which are carried in a stationary valve plate. The alignment of these openings creates direct turbulence-reducing fluid passageways between adjacent chambers which are each separated by the valve mechanism. During and after alignment of the rotary valve plate openings with the stationary vavle plate openings, the rotary valve plate is moved axially away from the stationary valve plate to eliminate interference between the rotary valve plate when rotating relative to the stationary valve plate. The openings of the rotary valve plate and the stationary valve plate stay in alignment with each other, once aligned, during the axial movement. The axial movement is created from the same single rotary input which rotates the rotary valve plate.

The rotary input supplied to the rotary valve plate is delivered by a threaded spindle. The threaded spindle has one driven end extending out of a chamber which holds a fluid to be mixed, and the other end threaded into the rotary valve plate with a light interference fit. The light interference fit allows the rotary valve plate to rotate with the spindle through a predetermined angle until a notch on the rotary valve plate engages with a stop pin carried in the chamber. After the notch engages a stop pin, the rotary movement of the rotary valve plate ceases and the light interference fit is overcome so that the rotary valve plate may only move axially upon continued rotation of the spindle.

In opening the valve, the notch in the rotary valve plate allows for the rotary valve plate to first be rotated into alignment with openings in the stationary valve plate so that fluid passages are created. Then, once aligned, the notch allows for the rotary valve plate to be backed away even further from the stationary valve plate while keeping the openings aligned with one another all the time. In closing the valve, the notch allows for the elimination of the fluid passages created by first allowing the rotation of the rotary valve plate until misalignment between the openings in the rotary valve plate and the openings in the stationary valve plate occurs. Then, the notch allows the rotary valve plate to be held against rotation while the spindle is rotated to drive the rotary valve plate axially for tight seating against the stationary valve plate, thus creating a fluid-tight seal between the adjacent chambers.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
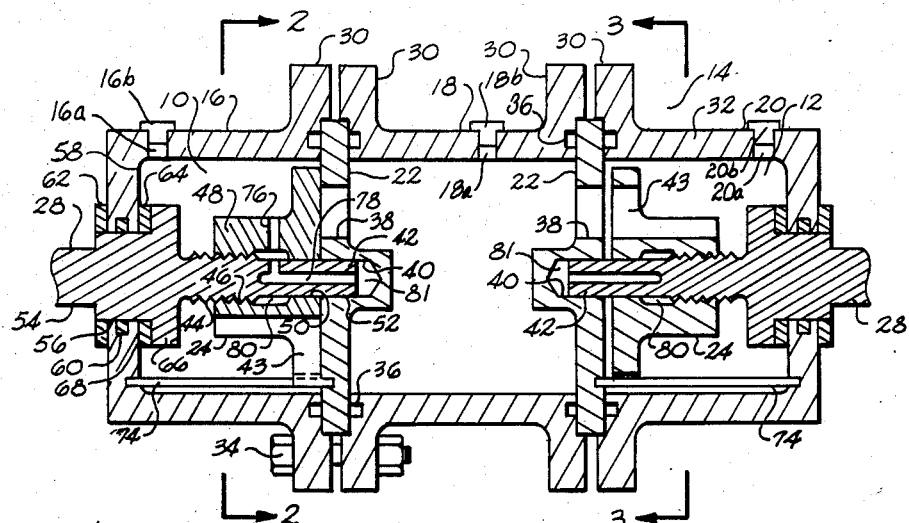
FIG. 1 is a longitudinal section through adjacent mixing chambers incorporating the valve mechanism of the present invention.

Referring now in more detail to the drawings, two dual motion valve assemblies 10, 12 are illustrated in FIG. 1. The valve assemblies 10, 12 are designed to minimize fluid turbulence and convection mixing during their opening and closing. Thus, the valve assemblies 10, 12 promote the combining of the fluids by diffusion mixing only. Valve assemblies 10, 12 can be actuated independently or simultaneously, and their manner of operation is identical to one another. Valve assemblies 10, 12 are carried in a valve housing 14 which is comprised of adjacent fluid carrying reaction chambers 16, 18, 20. Fill ports 16a, 18a, 20a with closure caps 16b, 18b, and 20b are used to introduce fluid into and remove fluid from the chambers 16, 18, 20. The reaction chambers 16, 18, 20 can carry various organic solutions which are to be combined through diffusion mixing to provide organic crystals.

In FIG. 1, valve assembly 10 is shown in its closed position, and valve assembly 12 is shown in its open position. When valve assembly 12 is in its open position, fluid carried in reaction chamber 20 may communicate with intermediate reaction chamber 18. Likewise, when valve assembly 10 is in its open position, fluid carried in chamber 16 may also communicate with intermediate chamber 18.

Each valve assembly 10, 12 includes a stationary valve plate 22, a rotary valve plate 24 having a slot or notch 26 and a threaded spindle 28 on which the rotary valve plate 24 is carried for rotation.

The stationary valve plate 22 of each valve assembly 10,12 is fixedly mounted perpendicularly between adjacent reaction chambers 16, 18, 20. The reaction chambers 16, 18, 20 are held together with bolt flanges 30 which are constructed integrally with their respective chamber outer shells 32. Bolts 34 passing through the bolt flanges 30 force the reaction chambers 16, 18, 20 tightly together, and flange gaskets 36 seal the bolt flange 30 areas against fluid leakage. Each stationary valve plate 22 has three equally spaced stationary valve plate openings or ports 38 plus a receiving bore 40 for accommodating an end 42 of the threaded spindle 28.

The rotary valve plate 24 of each valve assembly 10,12 is essentially disc shaped and is carried for rotation and axial movement in its respective chamber by means of its threaded spindle 28. Each rotary valve plate 24 has three equally spaced rotary valve openings or ports 43 which are aligned with the stationary valve plate ports 38 to provide passageways between adjacent reaction chambers 16, 18, 20. External threads 44 of spindle 28 mate with a light interference fit with internal threads 46 of a boss 48 carried at the center of the rotary valve plate 24. The light interference fit allows the rotary valve plate 24 and the threaded spindle 28 to rotate together as a single unit when the threaded spindle 28 receives a rotary input. In addition to the mating of the threads 46, 44 of the rotary valve plate 24 and the spindle 28, mating also occurs between an aligning hole 50 and an aligning shaft portion 52 of the spindle 28 to assure axial symmetry between the rotary valve plate 24 and the spindle 28. The aligning shaft portion 52 is also carried in the receiving bore 40 of the stationary valve plate 22. This further ensures axial symmetry between the rotary valve plate 24 and the stationary valve plate 22 for providing good sealing characteristics when the valve mechanism 10, 12 is in the closed position, and also for minimizing friction during opening and closing of the valve mechanism 10, 12.

Each threaded spindle 28 is supported at its outer end 54, opposite end 42, by a cylindrical bore 56 which is carried in the closed end 58 of reaction chambers 16 and 20. Fluid leakage between the spindle 28 and the interior of the cylindrical bore 56 is prevented by providing one or more O-rings 60 or other suitable gasket in each of the cylindrical bores 56. A spindle driver (not shown) for transmitting a rotary input to the spindle 28 such as a spur gear is mounted adjacent the outer end 54 of the spindle 28 by taper pins, set screws, or other suitable means. A thrust washer 62 is placed around the outer end 54 of the spindle 28 between the spindle drive and a portion of the chamber outer shell 32 for contacting with both the cylindrical bore 56 and the spindle driver. The thrust washer 62 helps limit axial movement between the spindle 28 and the reaction chamber 16 or 20. A spring washer 64 is placed around the outer end 54 of each spindle 28 between a circumferential collar 66 carried by the spindle 28 and the interior chamber surface 68 adjacent the cylindrical bore 56. The cylindrical collar 66 is of larger diameter than the cylindrical bore 56 to axially fix the spindle 28 from outward movement. The spring washer 64 acts against the collar 66 and the interior chamber surface 68 to bias the spindle 28, and thus the rotary plate 24 carried thereon, towards the stationary valve plate 22 to further ensure a fluid-tight seating between the rotary valve plate 24 and the stationary valve plate 22 when the valve assembly 10, 12 are in a closed position. When a valve assembly 10,12 is open, spring washer 64 preloads the spindle 28 to prevent fluid flow disturbances caused by any looseness or chattering of the spindle 28 and the rotary valve plate 24 in the axial direction due to vibration or g-loads within the valve housing 14.

A circumferentially extending slot or notch 26 is included on the periphery of each rotary valve plate 24. The notch 26 terminates at each of its two ends with a radially extending edge 70, 72. Each radially extending edge 70, 72 of the notch 26 is for abutting engagement with a stop pin 74 which is carried longitudinally in each reaction chamber 16, 18, 20. The stop pin 74 limits the rotation of an associated rotary valve plate 24 to less than one complete revolution by abutting contact with either of the radially extending edges 70, 72 of the notch 26.

Figure 2:
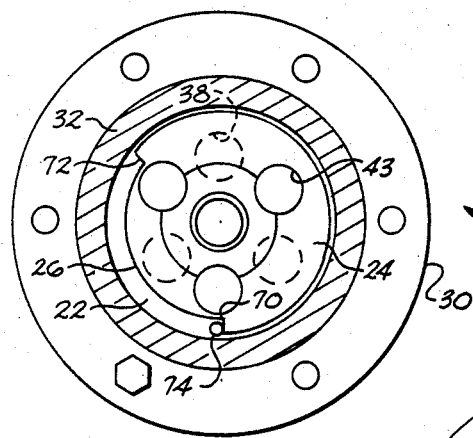
FIG. 2 is a sectional view taken along line 2—2 of FIG. 1.

FIG. 2 illustrates the valve assembly 10 of reaction chamber 16 in a closed position. Stationary valve plate ports 38 and rotary valve plate ports 43 are in a staggered or misaligned relationship to one another, thereby permitting a fluid-tight seal which prevents fluid flow between the adjacent reaction chambers 16 and 18. In this position, stop pin 74 is shown in contact with edge 70 of notch 26.

To open the valve assembly 10 from the closed position as shown in FIG. 2, the spindle 28 is first rotated in a direction which will advance the spindle threads 44 into the rotary valve plate 24. In the embodiment of FIG. 1, the spindle 28 of the reaction chamber 16 is rotated in a clockwise direction, looking from the outer end 54 of the spindle 28, because the external threads 44 of spindle 28 are right handed. The spindle 28 is axially fixed, as mentioned above: therefore, the rotary valve plate 24 is pulled away from the stationary valve plate 22 as the spindle 28 is rotated. The abutting relationship between the stop pin 74 and the edge 70 of the notch 26 prevents the rotary valve plate 24 from rotating with the spindle 28. When sufficient clearance between the formerly abutting rotary valve plate 24 and the stationary valve plate 22 is achieved, the clockwise rotation of the spindle 28 is stopped. The spindle 28 is then rotated counterclockwise approximately 60 degrees, which also rotates the rotary valve plate approximately 60 degrees since the edge 70 of the notch 26 is moved away from the stop pin 74. This aligns the rotary valve plate ports 43 with the stationary valve plate ports 38 to create fluid passages through the ports 38, 43. The valve assembly 12 is shown in its open position in FIG. 3.

Figure 3:
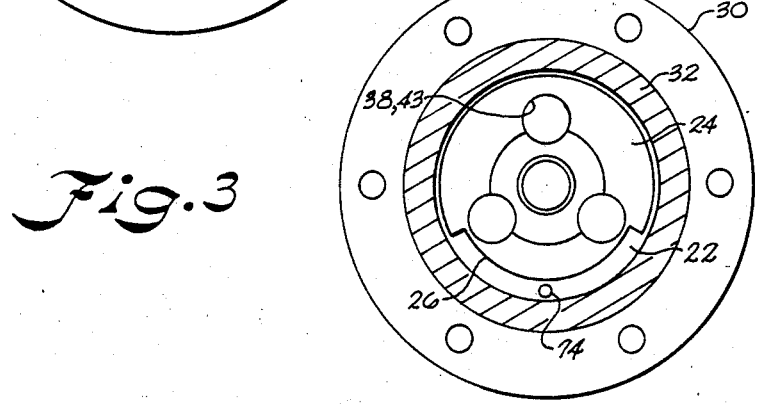
FIG. 3 is a sectional view taken along line 3—3 of FIG. 1.

To close the valve assembly 10, 12, the spindle 28 is again rotated counterclockwise 60 degrees, as seen in FIG. 3, to position the edge 72 of the notch 26 against the stop pin 74 to prevent the rotary valve plate 24 from further rotation. Continued counterclockwise rotation of the spindle 28 moves the rotary valve plate 28 axially, without rotation, against the stationary valve plate 22 until the rotary valve plate 24 is properly seated on the stationary valve plate 22. When proper seating occurs, the spring washer 64 will be loaded, and the interconnecting adjacent chambers 16, 18, 20 will be sealed off from one another.

A rotary valve plate ventilation port 76 is carried in each rotary valve plate 24 to communicate with a spindle ventilation port 78 carried in each spindle 28, along with any other necessary ventilation channels, to provide fluid passageways which allow cavities 80, 81 to be properly wetted.

Figures 4, 5:
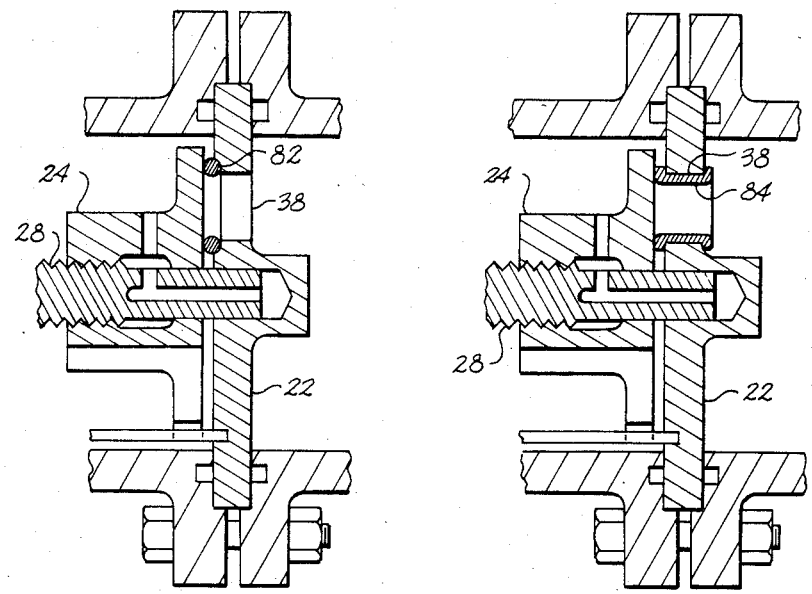
FIG. 4 is an enlarged cross sectional view of an alternate embodiment of a portion of the structure shown in FIG. 1.
FIG. 5 is an enlarged cross sectional view of an alternate embodiment of a portion of the structure shown in FIG. 1.

In FIG. 4, an alternate embodiment is shown where elastomer rings 82, or, as shown in FIG. 5, elastomer grommets 84, are carried adjacent stationary valve plate ports 38 to better seal off the adjacent chambers 16, 18, 20 from one another when a valve assembly 10, 12 is in a closed position. The elastomer rings 82 or grommets 84 would advantageously allow sealing off of the adjacent chambers from one another even if a small object, such as a crystal formed during crystalline growth of a diffusion reaction experiment, becomes caught between the rotary valve plate 24 and the stationary valve plate 22 as the rotary valve plate 24 advances against the stationary valve plate 22 during closing of a valve assembly 10, 12. The rings 82 or grommets 84 are able to deform around the small object and still seat with the rotary valve plate 24 to provide fluid-tight seal between the rotary valve plate 24 and the stationary valve plate 22.

Figure 6:
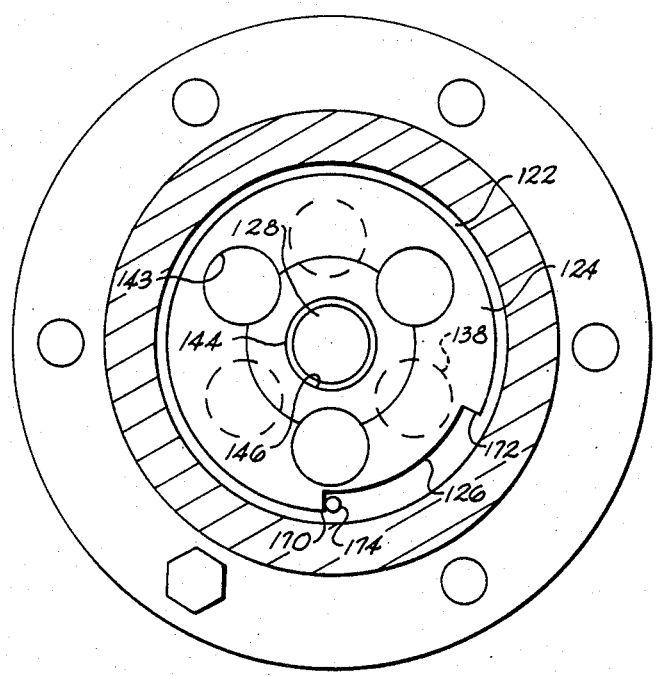
FIG. 6 is an enlarged cross sectional view similar to FIG. 2 of an alternate embodiment of the present invention.

In FIG. 6, another alternate embodiment is illustrated where rotary valve plate 124 has a notch 126 of shorter length than the notch 26. The shorter length notch 126 limits the angular rotation of the rotary valve plate 124 to approximately 60 degrees. This allows the rotary valve plate ports 143 on the rotary valve plate 124 to be aligned or misaligned with the stationary valve plate ports 138 on the stationary valve plate 122 to provide an open or closed valve assembly, as does the original embodiment, with only 60 degrees of rotation required of the rotary valve plate 124. To open the valve assembly, the drive spindle 128 is rotated clockwise. Right-hand external threads 144 of the spindle 128 are mated with internal threads 146 of the rotary valve plate 124 as in the original embodiment. The clockwise rotation of the spindle 128 thus imparts a clockwise torque on the rotary valve plate 124 and tends to rotate rotary valve plate 124 clockwise as well. In the closed position the rotary valve plate 124 resists rotation due to the interfacing friction between the rotary valve plate 124 and the stationary valve plate 122. Therefore, the rotary valve plate 124 takes the path of least resistance and moves axially only during the opening phase until resistance offered by the light interference fit between the spindle 128 and the rotary valve plate 124 overcomes the frictional resistance between the rotary valve plate 124 and the stationary valve plate 122. Consequently, the rotary valve plate 124 is allowed to then rotate with the spindle 128 until stopped by the stop pin 174 coming into contact with the notched edge 172 of slot 126. The valve is then in the open position. To close the valve assembly, the spindle 128 is rotated counterclockwise the same number of degrees as it was rotated during opening with the first 60 degrees of counterclockwise rotation positioning the notch 170 against the stop pin 174, and the remaining counterclockwise rotation driving the rotary valve plate 124 against the stationary valve plate 122 to complete the sealing operation.

This alternate embodiment allows for the valve assembly to be opened by the rotating of the spindle clockwise only, and thus eliminates the need to rotate the spindle goth in a clockwise direction and a counterclockwise direction as is done in the original embodiment.

Figure 7:
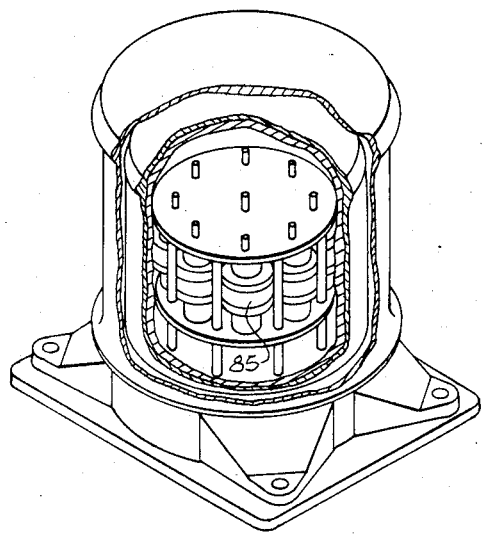
FIG. 7 is a perspective view, with parts cut away, of an application of the present invention.

In FIG. 7, several individual experiments 85 using adjacent reaction chambers are illustrated which can be conducted simultaneously by using the present invention.

Valve action of the present invention is such that a minimum of fluid turbulence is induced during the opening and closing of the valve. Using a simple rotary motion input, the valve is opened by first backing the rotary valve plate away from the stationary valve plate axially, without rotation, and then by rotating the rotary valve plate to an open position. The valve is also closed using a simple rotary input which rotates the rotary valve plate for a limited time and then axially advances and seats the rotary valve plate, without rotation, against the stationary valve plate without a fluid-tight seal between adjacent reaction chambers. Thus, a single rotary input is converted to a combination rotary movement—axial movement output by the present valve which provides for low-turbulence fluid flow between adjacent reaction chambers.

While a preferred embodiment of the invention has been described using specific terms, such description is for illustrative purposes only, and it is to be understood that changes and variations may be made without departing from the spirit and scope of the following claims.

What is claimed is:

1. A valve structure for controlling fluid flow, comprising:
   a longitudinally extending valve housing having a cylindrical bore at one end;
   a valve assembly carried within said valve housing, including;
   (i) a stationary valve plate being substantially perpendicular to said valve housing having a predetermined number of stationary valve plate ports spaced about said stationary valve plate;
   (ii) a rotary valve plate being substantially parallel to said stationary valve plate having a predetermined number of rotary plate valve ports;
   (iii) a longitudinally extending threaded spindle rotatably connected at one end to said rotary valve plate for selective both with and relative to said rotary valve plate, said spindle being carried at its other end for substantially axially-fixed rotation in said cylindrical bore of said valve housing;

(iv) a longitudinally extending stop pin carried substantially perpendicular to and for engagement with said rotary valve plate for preventing said rotary valve plate from rotating a complete revolution upon rotation of said spindle;

said spindle providing upon its rotation, axial and limited rotational movement of said rotary valve plate relative to said stationary valve plate while maintaining said rotary valve plate substantially parallel to said stationary valve plate; and said spindle selectively providing upon rotation, alignment between said rotary valve plate ports and said stationary valve plate ports, to thereby selectively provide an open fluid passage within said valve housing extending through both said rotary valve plate and said stationary valve plate.

2. A valve structure as set forth in claim 1, wherein said rotary valve plate is substantially a circular disc and further includes a circumferentially extending slot, having two ends, extending through a portion of the circumference of said rotary valve plate, said slot terminating at each of said two ends with a radially extending edge for engagement with said stop pin.

3. A valve structure as set forth in claim 1, wherein said spindle includes a circumferential collar carried adjacent to and having a larger diameter than said cylindrical base of said valve housing for axially fixing said spindle from outward axial movement with respect to said housing.

4. A valve structure as set forth in claim 3, further comprising:

a spring washer carried between and contacting said collar and said valve housing for biasing said spindle towards said stationary valve plate, thereby biasing said rotary valve plate towards said stationary valve plate.

5. A valve structure as set forth in claim 1, further comprising:

a first ventilation port carried in said rotary valve plate;

a second ventilation port carried in said spindle; and said first ventilation port and said second ventilation port being in communication with one another for providing a fluid passage from within said valve housing to said spindle through said rotary valve plate.

6. A valve structure as set forth in claim 1, further comprising:

an elastomer ring carried adjacent to and encircling a predetermined number of said stationary valve plate ports for providing a deformable fluid-tight seal between said stationary valve plate and said rotary valve plate when said rotary valve plate is brought within close proximity of said valve plate.

7. A valve system for controlling fluid flow comprising:

a longitudinally extending valve housing, including:
(i) a first chamber having a first cylindrical bore;
(ii) a second chamber having a second cylindrical bore, said second chamber being oppositely opposed and reversed with respect to said first chamber;
(iii) an intermediate chamber carried between and connecting together said first chamber and said second chamber;

a dual valve assembly carried in said valve housing, including:
(i) a first stationary valve plate carried in and substantially perpendicular to said first chamber having a plurality of first stationary valve plate ports;
(ii) a second stationary valve plate carried in and substantially perpendicular to said second chamber having a plurality of second stationary value plate ports;
(iii) a first rotary valve plate carried in said first chamber substantially parallel to said first stationary valve plate having a plurality of first rotary valve plate ports carried therein;
(iv) a second rotary valve plate carried in said second chamber substantially parallel to said second stationary valve plate having a plurality of second rotary valve plate ports carried therein;
(v) Rotation means for rotating said first rotary valve plate and said second rotary valve plate so that said first rotary valve plate ports and said first stationary valve plate ports are in substantial alignment and second rotary valve plate ports and said second stationary valve plate ports and in substantial alignment; said rotation means allowing axial movement of said first rotary valve plate with respect to said first stationary valve plate while simultaneously maintaining said first rotary valve plate ports and said first stationary valve plate ports in said substantial alignment; said rotation means allowing axial movement of said second rotary valve plate with respect to said second stationary valve plate while simultaneously maintaining said second rotary valve plate ports and said second stationary valve plate ports in said substantial alignment; said rotation means being rotatably carried in said first cylindrical bore and said second cylindrical bore;
(vi) rotation limitation means for selectively limiting rotation of said first rotary valve plate and said second rotary valve plate to less than one complete revolution.

8. A valve system as set forth in claim 7, wherein each said first rotary valve plate and said second rotary valve plate is a substantially circular disc having a circumferentially extending slot through a portion of the circumference of each said disc, each said slot terminating at each end with a radially extending edge for engagement with said rotation limitation means.

9. A valve system as set forth in claim 7, further comprising:

a first collar attached to said rotation means having a larger diameter than and carried adjacent to said first cylindrical bore;

a second collar attached to said rotation means having a larger diameter than and carried adjacent to said second cylindrical bore; and said first collar and second collar acting to prevent axial movement while permitting rotational movement of said rotation means with respect to said valve housing.

10. A valve system as set forth in claim 9, further comprising:

a first spring washer carried between and contacting said first collar and said first chamber;

a second spring washer carried between and contacting said second collar and said second chamber;

said first spring washer and said second spring washer biasing said rotation means towards said first stationary valve plate and said second stationary valve plate.

11. A valve system as set forth in claim 7, further comprising:
a first ventilation means carried in said first rotary valve plate and said second rotary valve plate;
a second ventilation means carried in said rotation means; and
said first ventilation means and said second ventilation means being in communication with one another for providing a fluid passage from within said valve housing to said rotation means through said first rotary valve plate and said second rotary valve plate.

12. A valve system as set forth in claim 7, wherein:
said first cylindrical bore of said first chamber and said second cylindrical bore of said second chamber are co-axially aligned with one another.

13. A valve system for controlling fluid flow comprising:
a longitudinally extending valve housing;
a valve assembly carried in said valve housing, including;
(i) a stationary valve plate having a plurality of stationary valve plate ports;
(ii) a rotary valve plate carried substantially parallel to said stationary valve plate having a plurality of rotary valve plate parts;
means for rotating said rotary valve plate so that said rotary valve plate ports are in substantial alignment with said stationary valve plate ports, thereby forming a plurality of fluid passages through both said rotary valve plate and said stationary valve plate, said means for rotating said rotary valve plate allowing axial movement of said rotary valve plate towards and away from said stationary valve plate while maintaining said rotary valve plate ports and said stationary valve plate ports in said substantial alignment; and
means for limiting rotation of said rotary valve plate, once a predetermined orientation between said rotary valve plate ports and said stationary valve plate ports is achieved, while allowing axial movement of said rotary valve plate to thereby maintain said predetermined orientation between said rotary valve plate ports and said stationary valve plate ports.

* * * * *